US011396241B2

(12) United States Patent
Liu

(10) Patent No.: US 11,396,241 B2
(45) Date of Patent: Jul. 26, 2022

(54) POWER CONVERTER CONTROLLED CAPACITOR CIRCUITS AND METHODS

(71) Applicant: Queen's University at Kingston, Kingston (CA)

(72) Inventor: Yan-Fei Liu, Kingston (CA)

(73) Assignee: Queen's University at Kingston, Kingston (CA)

( * ) Notice: Subject to any disclaimer, the term of this patent is extended or adjusted under 35 U.S.C. 154(b) by 104 days.

(21) Appl. No.: 16/961,718

(22) PCT Filed: Jan. 15, 2019

(86) PCT No.: PCT/CA2019/050049
§ 371 (c)(1),
(2) Date: Jul. 13, 2020

(87) PCT Pub. No.: WO2019/136567
PCT Pub. Date: Jul. 18, 2019

(65) Prior Publication Data
US 2021/0070190 A1    Mar. 11, 2021

Related U.S. Application Data

(60) Provisional application No. 62/617,399, filed on Jan. 15, 2018.

(51) Int. Cl.
*B60L 53/60* (2019.01)
*H02J 7/02* (2016.01)
(Continued)

(52) U.S. Cl.
CPC ............... *B60L 53/60* (2019.02); *H02J 7/02* (2013.01); *H02M 1/143* (2013.01);
(Continued)

(58) Field of Classification Search
CPC .. B60L 53/60; B60L 2210/10; B60L 2210/30; H02J 7/02; H02M 3/35; H02M 1/143
(Continued)

(56) References Cited

U.S. PATENT DOCUMENTS 5,471,378 A * 11/1995 King ................. H02M 3/33546
363/80
5,668,464 A *  9/1997 Krein et al. ............ G05F 1/565
363/46
(Continued)

OTHER PUBLICATIONS

International Search Report and Written Opinion for corresponding International Application No. PCT/CA2019/050049 dated Mar. 28, 2019.
(Continued)

*Primary Examiner* — Jack Chiang
(74) *Attorney, Agent, or Firm* — Stephen J. Scribner

(57) ABSTRACT

A series circuit includes a capacitor connected in series with output terminals of a power converter. The power converter provides an auxiliary voltage and a controller controls the auxiliary voltage according to a selected function, such that the series circuit behaves as a capacitor, an inductor, or an impedance, based on the selected function. The controller may sense a voltage across the capacitor and use the sensed voltage to control the auxiliary voltage according to the selected function. The series circuit may be connected in parallel with output terminals of an AC-DC converter, wherein the series circuit operates according to a selected mode to produce the auxiliary voltage, and the auxiliary voltage substantially cancels a low frequency AC voltage ripple across the capacitor, such that a substantially pure DC output voltage is delivered to the load.

20 Claims, 8 Drawing Sheets

(51) Int. Cl.
  *H02M 3/335* (2006.01)
  *H02M 1/42* (2007.01)
  *H02M 1/14* (2006.01)

(52) U.S. Cl.
  CPC ......... *H02M 1/4208* (2013.01); *H02M 3/335* (2013.01); *B60L 2210/10* (2013.01); *B60L 2210/30* (2013.01)

(58) Field of Classification Search
  USPC ........................................................ 320/109
  See application file for complete search history.

(56) References Cited

U.S. PATENT DOCUMENTS

| | | | |
|---|---|---|---|
| 5,960,898 | A | 10/1999 | Okada et al. |
| 9,419,510 | B2 * | 8/2016 | Liu ........................ H02M 1/143 |
| 10,015,849 | B2 * | 7/2018 | Liu ........................ H02M 1/42 |
| 2004/0256917 | A1 | 12/2004 | Glenn |
| 2017/0288553 | A1 * | 10/2017 | Fahlenkamp et al. ...................... H02M 3/33523 |

OTHER PUBLICATIONS

Pickert, V., et al., "Controlled Series Capacitor Converters Applied in Generator-Sets for SHEVs", World Electric Vehicle Journal, vol. 3, pp. 477 to 481, International Battery, Hybrid and Fuel Cel Electric Vehicle Symposium (EVS24), Stavanger, Norway. May 13-16, 2009.

* cited by examiner

POWER CONVERTER CONTROLLED CAPACITOR CIRCUITS AND METHODS

This application is a 371 of International Application No. PCT/CA2019/050049 filed on Jan. 15, 2019, and claims the benefit of the filing date of Application No. 62/617,399 filed on Jan. 15, 2018, the contents of which are incorporated herein by reference in their entirety.

FIELD

This invention relates to AC-DC supplies. More specifically, this invention relates to circuit and methods for reducing or eliminating low-frequency AC ripple in the DC output of AC-DC power supplies.

BACKGROUND

Single phase AC to DC power supplies with power factor correction (PFC) are widely used in the power supply industry. The boost converter is most widely used to achieve power factor correction, as shown in FIG. 1. When power factor correction is achieved, the input current of the boost converter (before the bridge diode) is a sinusoidal waveform in phase with the input AC voltage (also a sinusoidal waveform). Therefore, it is commonly known that the output voltage of the boost converter, Vout, as shown in FIG. 1, contains a double line frequency (100 Hz for Europe, Asia, and 120 Hz for North America) ripple. The amplitude, or the peak to peak value, of this ripple depends on the value of the output capacitor, Cout, and the load current, Iout. The double line frequency voltage ripple is removed by a second stage DC to DC converter, as shown in FIG. 2. In this figure, the application is an electric vehicle (EV) battery charger, where it is assumed that the whole power supply is used to charge the battery pack of the EV.

A problem of the above method is that the output power is converted twice. The first time is in the boost converter which achieves power factor correction. The second time is in the DC to DC converter which removes the double line frequency ripple voltage present at the output of the boost converter and regulates the voltage. Therefore, the efficiency of the converter is low and the size of the power supply is large. The cost is also higher since each of the two stages must be designed to handle the whole output power.

In order to reduce the double line frequency ripple at the boost converter output, a large capacitor is needed. Typically, an electrolytic capacitor is used. For example, for 6.6 kW output power with EV battery voltage range of 250V to 430V (Vbattery), the battery charging current is about 24 A. With 6.6 kW maximum output power and 400V boost output voltage (Vboost), the output current of the boost converter is about 16.5 A. In order to limit the double line frequency ripple to about +/−10V, the output capacitor value of the boost converter (Cout) should be about 3,200 uF. This is a very large capacitor value, requiring, e.g., six 560 uF capacitors in parallel to provide 3,360 µF. Typically, the life span of an electrolytic capacitor is relatively short (defined at 2000 hours or 5000 hours), compared to other types of capacitors, such as film capacitors. The shorter life span of the electrolytic capacitor will reduce the life span of the EV battery charger. However, the value of a film capacitor is much less than the value of an electrolytic capacitor for same physical volume. For example, an electrolytic capacitor with value 560 uF, 450V is 4.5 cm (height) and 3.5 cm diameter, which occupies a volume of 55 cm$^3$. A film capacitor of similar volume, 56.7 cm$^3$, has a value of only 50 uF, 500V. Thus, for the same volume, the value of a film capacitor is about 9% the value of an electrolytic capacitor. In other words, if film capacitors are used to improve the reliability of the battery charger, they require 11 times the volume (or space) of the power supply, which is too large to be practicle.

SUMMARY

According to one aspect of the invention there is provided a series circuit, comprising: a capacitor having a first terminal A and a second terminal; and a power converter having a first output terminal connected to the second terminal of the capacitor and a second output terminal B; wherein the power converter outputs an auxiliary voltage; a controller that controls the power converter auxiliary voltage according to a selected function; wherein the series circuit behaves as a capacitor, an inductor, or an impedance, based on the selected function.

In one embodiment the controller comprises a sensing circuit that senses a voltage across the capacitor and uses the sensed voltage to control the power converter auxiliary voltage according to the selected function.

In one embodiment the series circuit behaves as an infinitely large capacitor, based on the selected function.

According to another aspect of the invention there is provided a power supply, comprising: an AC-DC converter having first and second input terminals for receiving AC input power and first and second output terminals for outputting DC power to a load; and a series circuit as described herein, wherein terminals A and B of the series circuit are connected to the first and second output terminals, respectively, of the AC-DC converter; wherein the series circuit operates according to a said selected mode to produce the auxiliary voltage; wherein the auxiliary voltage substantially cancels a low frequency AC voltage ripple across the capacitor; wherein a substantially pure DC output voltage is delivered to the load.

In one embodiment the AC-DC converter comprises a single stage power factor correction (PFC) circuit.

In various embodiments the controller senses at least one of a voltage across the capacitor and a power supply output current, and uses the sensed voltage and/or current to control the power converter auxiliary voltage according to the selected function.

The power supply may further comprise a DC-DC converter connected between the output of the AC-DC converter and the load, wherein the DC-DC converter cancels a first portion of the low frequency AC voltage ripple across the capacitor; wherein the series circuit operates according to a said selected mode to produce the auxiliary voltage; wherein the auxiliary voltage cancels a second portion of the low frequency AC voltage ripple across the capacitor that is not cancelled by the DC-DC converter; wherein a substantially pure DC output voltage is delivered to the load.

The power supply may be configured as a power delivery device for one or more portable electronic device, or as a battery charger, or as a battery charger for an electric vehicle (EV).

According to another aspect of the invention there is provided a method for operating a series circuit comprising a capacitor having a first terminal A and a second terminal and a power converter having a first output terminal connected to the second terminal of the capacitor and a second output terminal B, wherein the power converter outputs an auxiliary voltage; the method comprising: controlling the power converter auxiliary voltage according to a selected function; wherein the series circuit operates as a capacitor, an inductor, or an impedance, based on the selected function.

In one embodiment the method comprises sensing a voltage across the capacitor and using the sensed voltage to control the power converter auxiliary voltage according to the selected function.

In one embodiment the series circuit operates as an infinitely large capacitor, based on the selected function.

The method may comprise connecting terminals A and B of the series circuit to first and second output terminals, respectively, of an AC-DC converter; and operating the series circuit according to a said selected mode to produce the auxiliary voltage; wherein the auxiliary voltage substantially cancels a low frequency AC voltage ripple across the capacitor; wherein a substantially pure DC output voltage is delivered to a load.

The method may comprise sensing at least one of a voltage across the capacitor and an output current delivered to the load, and using the sensed voltage and/or current to control the power converter auxiliary voltage according to the selected function.

The method may further comprise connecting a DC-DC converter between the output of the AC-DC converter and the load, wherein the DC-DC converter cancels a first portion of the low frequency AC voltage ripple across the capacitor; and operating the series circuit according to a said selected mode to produce the auxiliary voltage; wherein the auxiliary voltage cancels a second portion of the low frequency AC voltage ripple across the capacitor that is not cancelled by the DC-DC converter; wherein a substantially pure DC output voltage is delivered to the load.

BRIEF DESCRIPTION OF THE DRAWINGS

For a greater understanding of the invention, and to show more clearly how it may be carried into effect, embodiments will be described, by way of example, with reference to the accompanying drawings, wherein.

DETAILED DESCRIPTION OF EMBODIMENTS

Described herein is a series circuit, including a capacitor connected in series with an output of a power converter, wherein the power converter is controlled according to a selected function to provide an auxiliary voltage such that the series circuit operates as capacitor, an inductor, or an impedance. The series circuit, also referred to herein as a power converter controlled capacitor (PCCC), is suitable for applications such as a power adapter or power delivery (PD) application with, e.g., 100 W output power, or a battery charger, with higher output power, where power factor correction (PFC) is needed. With PCCC embodiments, a single stage AC to DC converter with power factor correction may be used. As described herein, the double line frequency ripple typically present at the output of a single stage PFC circuit is removed by a PCCC. Further, a series circuit of a PCCC embodiment requires a significantly smaller value of output capacitor than prior approaches. As a result, a PCCC circuit may allow the use of a film capacitor for the output capacitor, instead of an electrolytic capacitor, which improves reliability.

Figure 3:
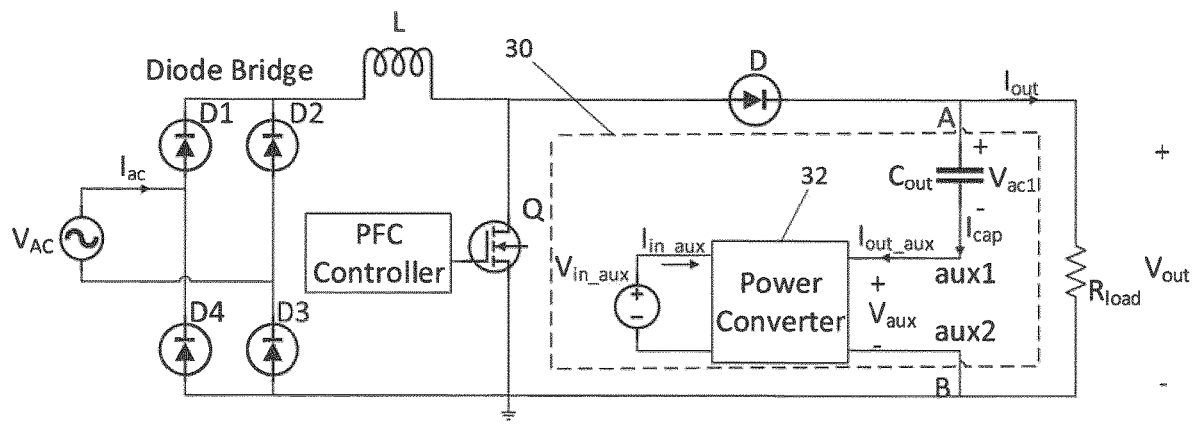
FIG. 3 is a schematic diagram of a boost converter with a power converter controlled capacitor (PCCC), according to one embodiment.

FIG. 3 shows a configuration of a PCCC circuit 30 according to one embodiment, based on a boost converter. The PCC circuit 30 is enclosed within the dashed lines and connected between points A and B of the boost converter. The PCCC circuit 30 includes a power converter 32 with output terminals that provide Vaux connected in series with the output capacitor Cout. The input of the power converter 32 is a DC power source (e.g., battery), Vin_aux. The output voltage of the power converter 32 may be controlled to generate a desired voltage signal according to the description below.

The embodiment of FIG. 3 is based on a boost converter. However, a PCCC embodiment as described herein may be used with other types of AC-DC converters, including, but not limited to, resonant, such as LLC, LCC, etc., isolated boost, flyback, and the like.

Figure 4:
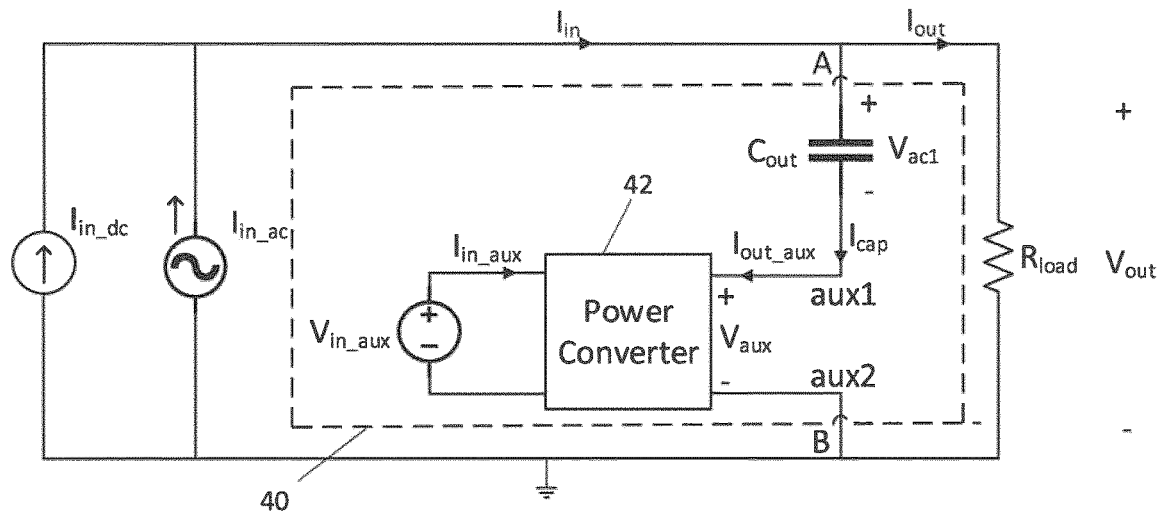
FIG. 4 is a schematic diagram of a generalized power supply incorporating a PCCC, according to embodiments described herein.

FIG. 4 shows a more general equivalent circuit diagram of the PCCC concept. In the figure, it is assumed that the low frequency equivalent circuit of the AC-DC converter is a DC input current and an AC input current connected in parallel, and are then connected to the PCCC circuit 40 and the load (Rload). The AC voltage (Vac1) across Cout caused by the AC current is compensated by the output terminals of the power converter 42 (Vaux) and the output voltage Vout delivered to the load is a pure DC voltage or a substantially pure DC voltage. It is noted that the current through the output capacitor, I_cap, is the same as the input AC current, I_in_ac. Based on the energy balance concept, the input current of the power converter 42, I_in_aux, is an AC current.

As used herein, "substantially pure" DC voltage or DC current is intended to refer to a DC voltage or DC current that has only a very small AC ripple that results from component tolerances and/or practical circuit implementations, such that the AC ripple can be considered negligible in a practical implementation.

One method for controlling the power converter 42 is to control the output voltage of the power converter to have zero DC voltage level (or a very small DC voltage level, such as less than 1% of the output voltage value of Vout) and an AC voltage with same amplitude of the voltage across Cout, Vac1, and in reverse polarity of Vac1. That is, $$Vac1=Vac1\_dc+Vac1\_rip \qquad (1)$$

Where Vac1_dc is the DC component of the voltage across Cout and Vac1_rip is the double line frequency of the voltage across Cout.

Then, according to the above control strategy, the output voltage of the power converter Vaux will be:

$$Vaux=0V+(-Vac1\_rip) \qquad (2)$$

Therefore, the boost converter output voltage, Vout is:

$$Vout=Vac1+Vaux=Vac1\_dc+Vac1\_rip+0V+(-Vac1\_rip)=Vac1\_dc \qquad (3)$$

It is noted from equation (3) above that the double line frequency component of Vout is zero. It is also noted that the current through the output capacitor, Cout, still contains double line frequency current ripple. That is, no AC voltage (or zero AC voltage) is generated by an AC current.

The relationship between the AC voltage across a capacitor and the AC current through a capacitor is described by the following equation:

$$V\_cap\_ac=I\_cap\_ac*Xc=I\_cap\_ac/(2\pi f\,C) \qquad (4)$$

In the above equation, f is the frequency of the AC current, C is the capacitance value, and I_cap is the capacitor current. Now V_cap_ac=0, this means that the capacitance value C is infinitely large.

Thus, the equivalent circuit between terminal A and terminal B is a capacitor with an infinitely large capacitance value. Or equivalently, the series connection of the output capacitor Cout and the output terminals of the power converter 42 (aux1 and aux2) which is controlled by equation (2), is a capacitor with an infinitely large capacitance value.

Although the above analysis is made based on the assumption that the frequency of the AC current through the output capacitor Cout is two times the AC line frequency, (120 Hz for North America and 100 Hz for Europe and Asia), it is noted that the conclusion is still valid when the frequency of the AC current is other values.

Figure 5:
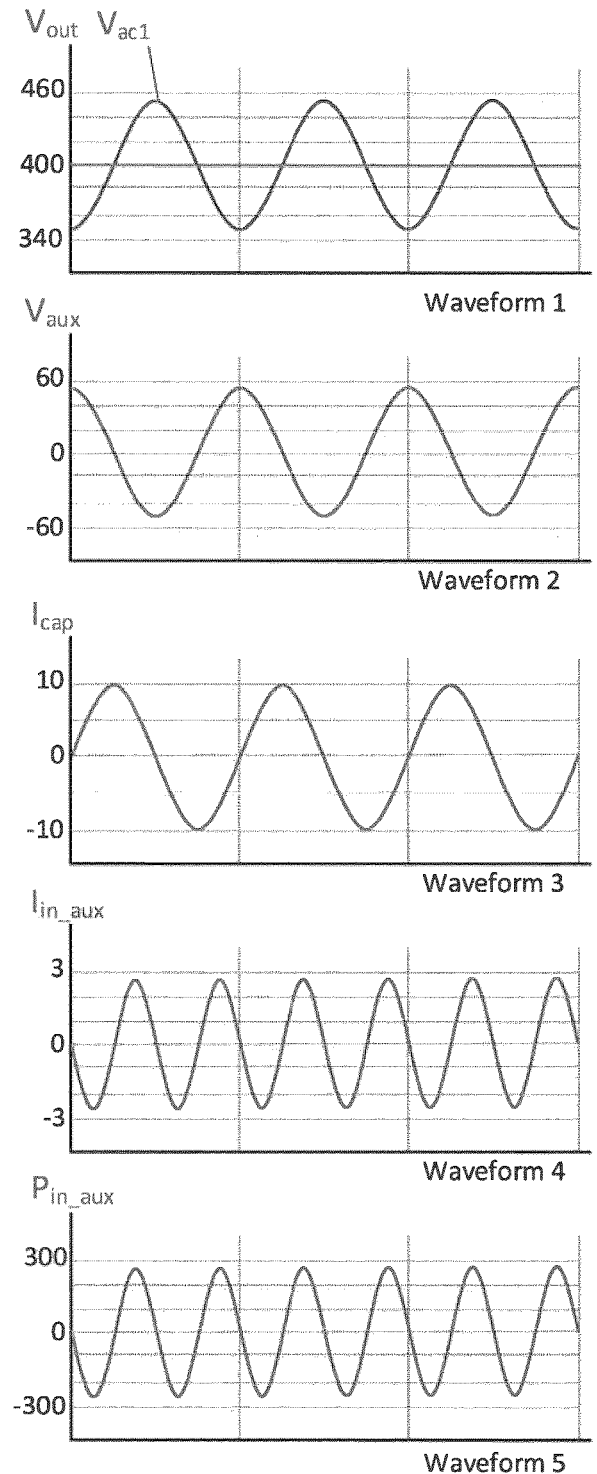
FIG. 5 shows waveforms obtained from a simulation of the embodiment of FIG. 4.

FIG. 5 shows the voltage and current waveforms for operation of the PCCC circuit of FIG. 4, obtained by a simulation using PSIM (PowerSim, Rockville, Md., USA). The simulation was done with the following parameters: I_in_dc=10 A, I_in_ac=10 A (peak, 100 Hz sinusoidal waveform, the peak to peak value is 20 A), Vout=400V DC, Cout=300 uF, Iout=10 A, Rload=40 ohm, Vin_aux=100V. Waveform 1 shows the waveforms of the output voltage, Vout, which is a DC voltage, and the voltage across Cout, Vac1. The ripple voltage of Vac1 is about 53V (peak, or 106V peak to peak). Waveform 2 is the output voltage of the power converter, Vaux. Its DC voltage value is zero and its AC voltage amplitude is same as the ripple voltage of Vac1 (53V peak) and the phase is reversed as compared with Vac1. Waveform 3 is the capacitor current I_cap. Its amplitude is 10 A peak.

It is observed that the low frequency AC value of the output voltage (Vout, between point A and point B), i.e., the series connection of capacitor (Cout) and the power converter 42, which is controlled by equation (2), is zero while the AC current through Cout and output terminals of the power converter 42 is not zero (10 A). This confirms that the equivalent capacitance value between point A and point B is infinitely large.

Waveform 4 is the input current of the power converter. Note that the frequency of the current is two times the frequency of the output capacitor current. The peak value of this current is about 2.73 A.

The input power processed by the power converter is shown in waveform 5. It shows that for half the cycle, the power converter 42 absorbs power from the DC source (when Pin_aux value is positive) and for the other half of the cycle, the power converter 42 delivers power to the DC source (when Pin_aux value is negative). The average power is zero. This is significant in the sense that in a practical application, the output power of the power supply (not shown in FIGS. 3, 4) that generates Vin_aux will be very small, and is only the loss in the power converter. The power converter 42 does not provide average power (or net power) to the load. The frequency of the power is the same as the frequency of the input current of the power converter 42 (I_in_aux).

The actual power rating of the power converter 42 can be estimated by taking the average value of the absolute number of Pin_aux, |Pin_aux|, in this example the value is 173 W. Therefore, in order to completely remove the AC voltage ripple across Cout, (Vac1), the power converter 42, as shown in FIG. 4, should handle approximately 173 W of power. It can be derived mathematically that the power handling capability of the power converter 42 can be calculated by the following equation:

$$Pin\_aux=0.5\times0.9\times Vaux\_pk\times I\_cap\_pk/1.414 \qquad (5)$$

In the above equation, Vaux_pk is the peak value of the AC output voltage of the power converter 42 and I_cap_pk is the peak value of the AC current through the output capacitor. In the case of the above simulation, Vaux_pk=53V and I_cap_pk=10 A. The calculated Pin_aux=169 W, which is very close to the simulated value of 173 W.

It is noted that the frequency of the input current, I_in_aux, and the input power, Pin_aux, of the power converter 42 is two times the frequency of its output current, which is same as the capacitor current, I_cap, as shown in FIG. 5. For 60 Hz line frequency, the frequency of the current through output capacitor (Cout) is 120 Hz and the frequency of the power converter input current Iin_aux is 240 Hz. This is beneficial to reduce the input capacitance value of the power converter in a practical design.

From FIG. 5, it is observed from waveform 2 and waveform 3, looking into the power converter 42 from terminal aux1 and terminal aux 2, the voltage, Vaux, will lead current, I_cap, by 90 degrees. It is also observed that the rms value of the voltage Vaux=37.2V rms and the rms value of the current I_cap=7.07 A rms. The equivalent inductance value may be calculated as:

$$Leq=Vaux/I\_cap*1/(2*3.14*100\text{ Hz})=8.46\text{ mH} \qquad (6)$$

The resonant frequency of this equivalent inductor and the capacitor, Cout, may be calculated as following:

$$F_{resonant} = \frac{1}{2*3.14*\sqrt{Leq*Cout}} = 100 \text{ Hz} \qquad (7)$$

This is the same as the frequency through the capacitor, Cout. This reveals the fundamental principal of the PCCC as following:

1 The output voltage of the power converter is controlled according to equation (2),
2 The power converter behaves as a virtual inductor with value of Leq,
3 The virtual inductor, Leq, resonates with the real capacitor connected in series with it, Cout, at the same frequency of the current flowing through the real capacitor, Cout.

The end result is that the output voltage, Vout, is a substantially pure DC voltage as the ripple voltage across the real capacitor, Cout, is compensated by the equivalent inductor, Leq, which is produced by the power converter under the control law of equation (2).

It is noted that although the above analysis is based on one frequency (100 Hz in the above example), the control method of equation (2) and the circuit diagram as shown in FIG. 4 can also compensate the ripple voltage caused by multiple frequencies.

Figure 7:
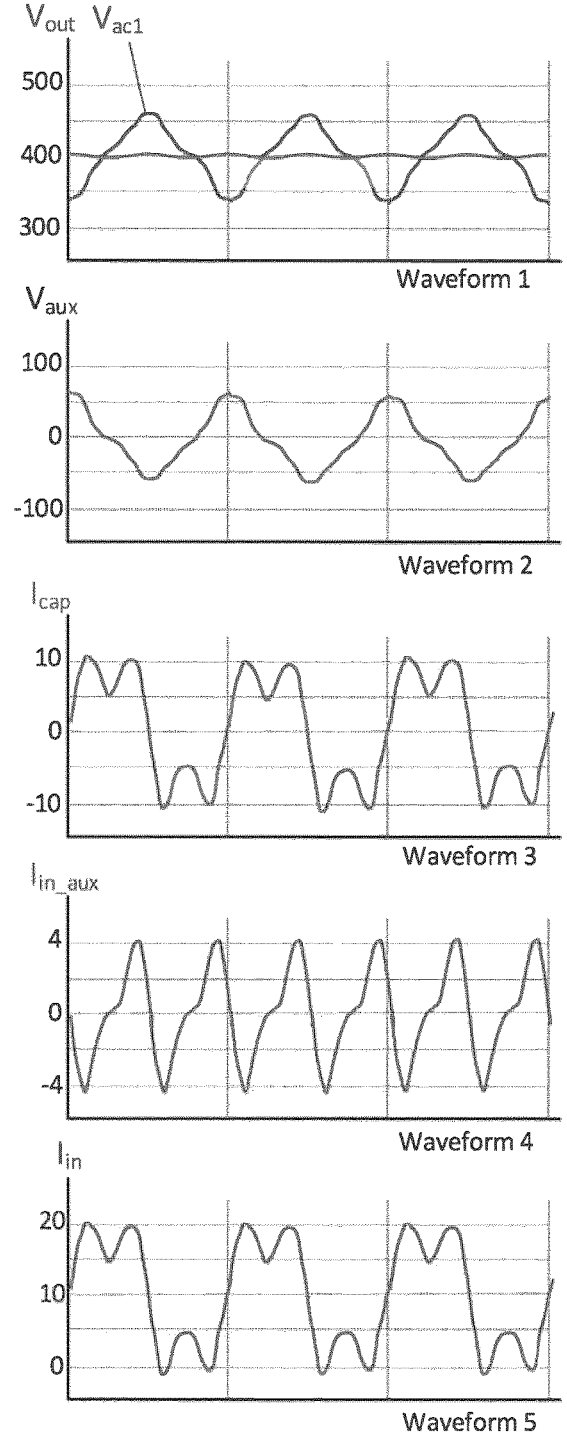
FIG. 7 shows waveforms obtained from a simulation of the embodiment of FIG. 4 with non-sinusoidal input current.

FIG. 7 shows the simulation results when the input current is:

$$I\_in=10A(DC)+10A*\sin(2*3.14*100\ t)+5A*\sin(2*3.14*300\ t) \qquad (8)$$

In the above case, a third harmonic of 5 A (peak) is added into the input current. The input current contains a DC value of 10 A, a fundamental value of 10 A at 100 Hz and a third harmonic of 5 A at 300 Hz. The input current, Lin, is shown in waveform 5. The simulated response is shown in FIG. 7. Waveform 1 shows the voltage across Cout, Vac1, and the output voltage, Vout. The ripple of Vac1 is not sinusoidal. The output voltage of the power converter under the control of equation (2) is shown in waveform 2, Vaux. It is still the in same shape as the Vac1 ripple and in reverse polarity. The current through the capacitor, I_cap, is shown in waveform 3. It indicates a third harmonic and fundamental components. The input current of the power converter (I_in_aux) is shown in waveform 4. The output voltage (Vout), which is the combined voltage of Cout and the output of the power converter under control of equation (2), is almost a DC voltage with very small ripple (around 3V peak). The small ripple of Vout is caused by the error in the simulation circuit implementation. Under an ideal case, Vaux will be able to completely cancel the ripple of Vac1 and a substantially pure DC voltage may be obtained at Vout.

The above analysis shows the following:
With the series connection of the capacitor, Cout and the power converter, as shown in FIG. 4 and the power converter is controlled according to the control law expressed in equation (2):
When the current through the capacitor is not a sinusoidal waveform, or an arbitrary waveform, the power converter will generate any shape of a voltage to completely cancel the ripple voltage across the capacitor (Cout); and
a pure or substantially pure DC voltage can be obtained at the output (Vout).

It is noted that if the power converter 42 is controlled by equation (2), the output of the power converter will behave as an inductor with its impedance equal to the impedance of the capacitor Cout. Therefore, impedance between point A and point B is equivalent to an infinitely large capacitor.

If the power converter 42 is controlled by equation (2.1) as following:

$$\text{Vaux}=0V+2*(-Vac1\_rip) \qquad (2.1)$$

Then the output of the power converter will behave as an inductor with its impedance equal to two times the impedance of the capacitor, Cout. Therefore, the impedance between point A and point B will behave as an inductor with its impedance value equal to the impedance value of Cout.

Similarly, by changing the gain of the (−Vac1_rip), the equivalent impedance between point A and point B can be changed from capacitive to inductive. When the gain is less than 1, the impedance is capacitive and when the gain is larger than 1, the impedance is inductive.

Power Converter Behaves as an Equivalent Capacitor

Figure 8:
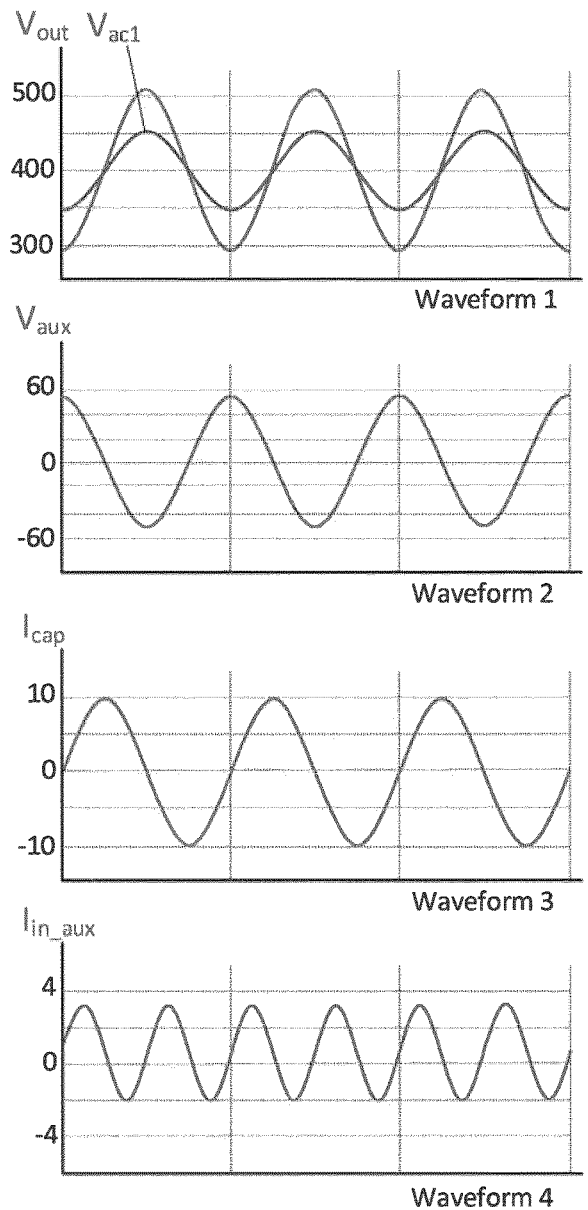
FIG. 8 shows waveforms obtained from a simulation when the power converter is controlled to be an equivalent capacitor, according to one embodiment.

In above analysis, the output of the power converter 42 is controlled to behave like an equivalent inductor, Leq, by equation (2). For the circuit as shown in FIG. 4, when the output voltage of the power converter, Vaux, is controlled according to the following equation:

$$\text{Vaux}=0(V)+Vac1\_rip \qquad (8.2)$$

then the output voltage of the power converter will follow the ripple voltage of Vac1. FIG. 8 shows the simulated waveforms. It is observed that the peak value of the output voltage ripple is about 105V, which is approximately two times the peak value of the Cout voltage (Vac1). It is also noted from waveform 2 and waveform 3 that, looking into the output terminals of the power converter, aux1 and aux2, the current, I_cap (=Iout_aux), is leading the voltage, Vaux, by approximately 90 degrees. The rms current is 7.07 A and the rms voltage is 37.2V. The equivalent capacitor may be calculated as:

$$C_{eq} = \frac{I\_cap}{2*3.14*F*Vaux} = \frac{7.07A}{2*3.14*100\text{ Hz}*37.2\text{ V}} = 302\ uF \qquad (8.1)$$

The equivalent capacitor is same as Cout. This is understandable since the control law of equation (8.2) determines that the AC voltage between terminal aux1 and terminal aux2 is same as the AC voltage of Vac1, which implies that the equivalent capacitor is same because the current through them is same, I_cap=Iout_aux.

The equivalent capacitor across terminal A and terminal B is two capacitors connected in series, one is 300 uF, and the other is 302 uF. The equivalent capacitor should be 151 uF, or approximately half of the Cout value. The ripple voltage will be approximately two times larger (105V peak value) as compared to the case without power converter.

This shows that the power converter behaves as an equivalent capacitor under the control of equation (8.2).

It is noted that in the power factor correction application, the power converter 42 may be made to behave as an equivalent inductor under the control of equation (2) so that the output voltage ripple can be reduced or eliminated. In other embodiments, the power converter may be controlled according to equation (8.2) so that the power converter behaves as an equivalent capacitor.

Power Converter Behaves as an Equivalent Impedance

If the power converter 42 shown in FIG. 4 is controlled by the following equation:

$$\text{Vaux}=0V-\text{Vac1\_rip}*\sin(2*3.14*100\ Hz*t-45\ degree) \quad (9)$$

Figure 9:
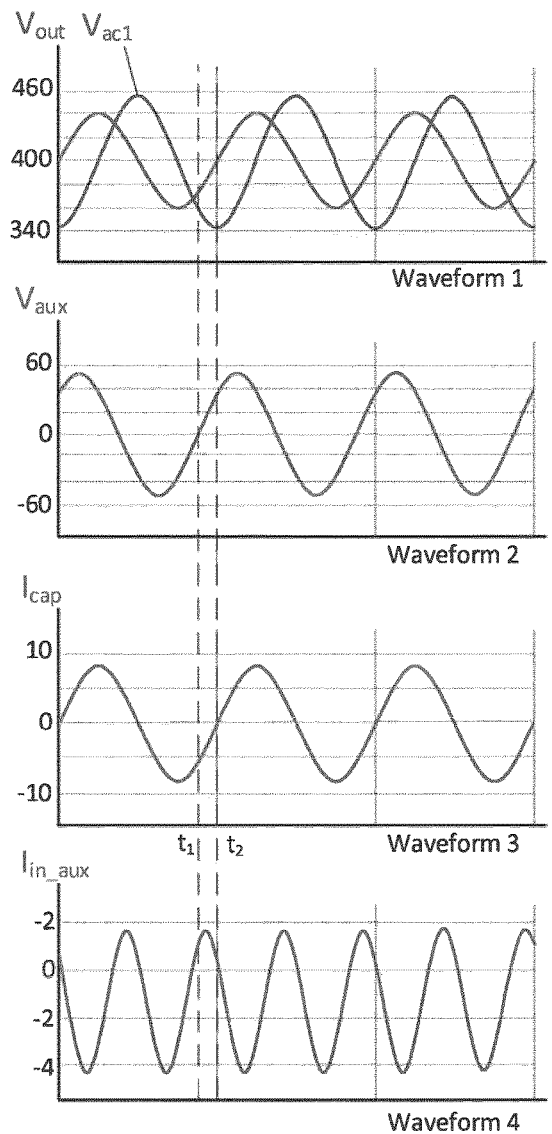
FIG. 9 shows waveforms obtained from a simulation when the power converter is controlled to be an equivalent impedance, according to one embodiment.
Figure 10:
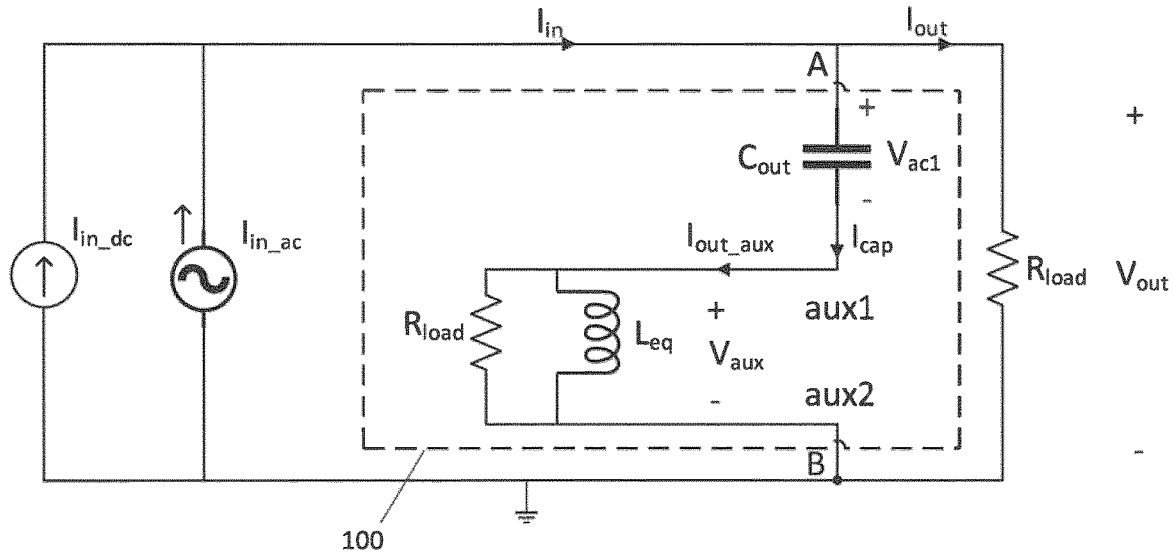
FIG. 10 is a schematic diagram of an equivalent circuit when the power converter is controlled to be an equivalent impedance, according to one embodiment.

Then the negative value of the ripple voltage of Vac1 is sensed. The delay angle is 45 degrees (negative 45 degrees). The simulation results are shown in FIG. 9. It is noted from waveform 2 and waveform 3 that the terminal voltage of the power converter (between terminal aux1 and aux2), or Vaux, is leading the current, I_cap, by approximately 1.23 ms (t2−t1), or 44.3 degree for frequency of 100 Hz. This indicates that the power converter behaves as an inductor in parallel with a resistor, as shown in equivalent circuit of the PCCC 100 as shown in FIG. 10.

From circuit theory analysis, the equivalent inductor value and resistor value may be calculated based on the simulated Vaux=37.2V, I_cap=7.07 A, delay angle of 45 degrees, and frequency is 100 Hz. The calculation result is:

$$Leq=11.8\ mH,\ Req=7.44\Omega \quad (10)$$

Note that the impedance of Leq in parallel with Req is 5.26Ω(=37.2V/7.07 A), which is approximately same as the impedance of a 300 uF capacitor at 100 Hz operating condition, which is Xc=5.31Ω. The small difference is due to the error in the simulation and calculation. It is also noted from waveform 1 that the ripple value of Vout is lower than the ripple value of Vac1. This indicates that terminal aux1 and terminal aux2 is an inductive load so that the total equivalent capacitance value between terminal A and terminal B is larger than Cout (which is 300 uF).

The above analysis shows that the impedance of the power converter 42 can be controlled using equation (9).

It may be calculated that the power loss across Req is approximately 186 W. Note that this means the power converter 42 is taking energy from the external circuit, such as Cout. Since the power converter is considered as ideal and no loss is dissipated inside the power converter, this power (186 W) is then transferred to the input DC source of the power converter, Vin_aux, as shown in FIG. 4. This can also be observed from waveform 4 in FIG. 9. It is noted that the input current of the power converter, I_in_aux, is a negative current. The average value can be calculated as −1.93 A (a negative value). Therefore, the power delivered to Vin_aux is:

$$Pin\_aux=Vin\_aux*I\_in\_aux=100V*(-1.93A)=-193\ W \quad (11)$$

The negative value indicates that the power is delivered from the output of the power converter (terminal aux1 and terminal aux2) to the input of the power converter (Vin_aux).

It is noted that 186 W and 193 W are very close. The difference is caused by systematic errors in the simulation and calculations.

Figure 11:
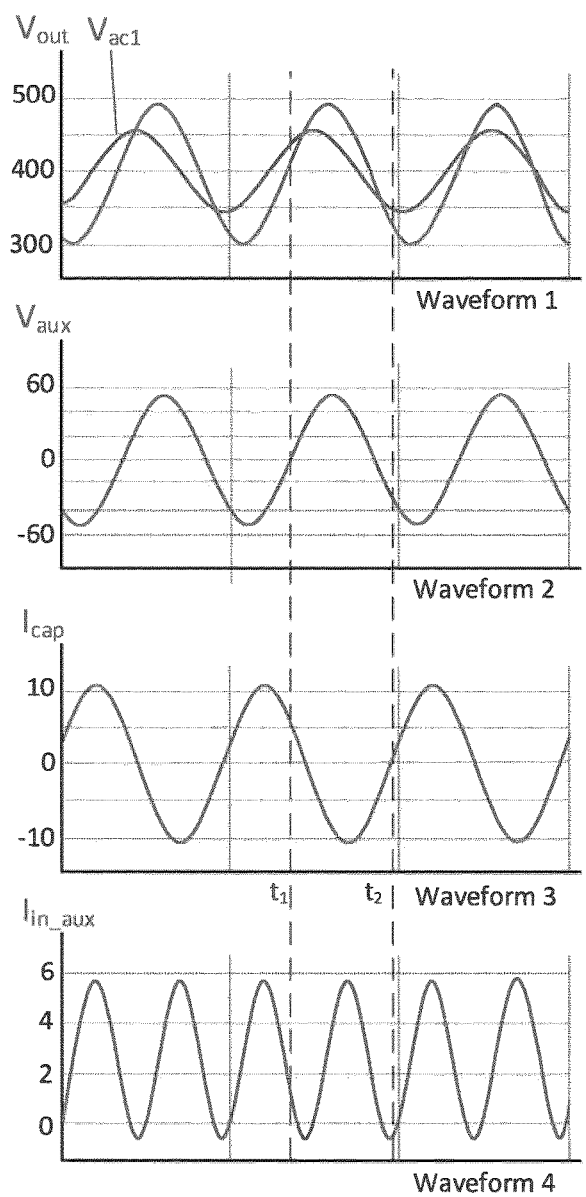
FIG. 11 shows waveforms obtained from a simulation when the power converter is controlled to be an equivalent impedance.
Figure 12:
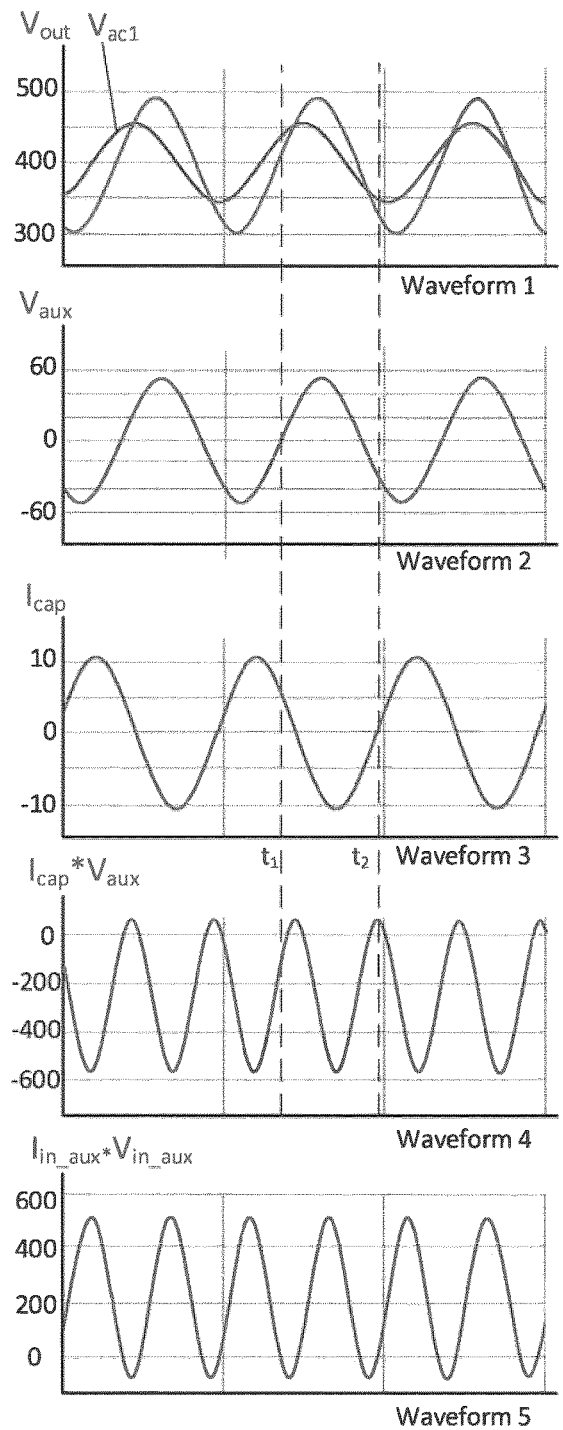
FIG. 12 shows simulated waveforms when the power converter is controlled to behave as a capacitive load, according to one embodiment.

If the power converter 42 shown in FIG. 4 is controlled by the following equation:

$$\text{Vaux}=0V+\text{Vac1\_rip}*\sin(2*3.14*100\ Hz*t-45\ degree) \quad (12)$$

the positive value of the ripple voltage of Vac1 is sensed. The delay angle is 45 degree (negative 45 degree). The simulation results are shown in FIG. 11 and FIG. 12. It is noted from waveform 2 and waveform 3 of FIG. 11 that the terminal current of the power converter (between terminal aux1 and aux2), or I_cap, is leading the terminal voltage, Vaux, by approximately 4 ms (t2−t1), or 72 degree. This shows the power converter behaves as a capacitive load.

This can also be observed from waveform 1 that the voltage ripple of output voltage (Vout) is higher than the voltage ripple of Vac1.

The average power the power converter takes is shown in waveform 4 (I_cap*Vaux) of FIG. 12 and is mostly negative, with an average value of approximately −240 W. This means that the actual power flow in this case is from input of the power converter (Vin_aux) to the output of the power converter and to the load. This can be confirmed from waveform 5 of FIG. 12. Waveform 5 shows the power delivered from the voltage source of Vin_aux. The average value is approximately positive 240 W.

SUMMARY

The above descriptions show that by controlling the output voltage of a power converter based on the voltage ripple of the capacitor connected in series with the output terminals of the power converter, the output terminals of the power converter will behave as either a virtual inductor, or a virtual capacitor, or a virtual impedance. Consequently, the total impedance of the series connected capacitor and the output terminals of the power converter (between point A and point B as in FIG. 4) may be controlled according to different modes to be capacitive, or inductive, or an arbitrary impedance. In extreme cases, the combined impedance may be controlled to be zero, equivalently, an infinitely large capacitor value can be achieved. Thus, using control strategies according to the above equations, the series connection of the output capacitor and the output terminals of the power converter will behave as a controlled impedance.

In a DC output voltage application, the most desired implementation is to let the power converter behave as a virtual inductor so that the total equivalent capacitance of the series connected capacitor and the power converter is very large. In this way, the voltage across the combined output capacitor, Cout, and the power converter, Vaux, (point A and point B in FIG. 4) is substantially free of any low frequency voltage ripple.

For high power applications, the power converter is typically a switching power converter. In this case, the frequency of the AC ripple voltage across the output capacitor is a multiple of the line frequency (50 Hz in Europe, Asia and 60 Hz in North America), such as 120 Hz, 360 Hz, 720 Hz, 900 Hz, etc., which is normally much lower than the switching frequency of the power converter. For example, in a typical application, the frequency of the AC ripple voltage is 120 Hz and the switching frequency is 200 KHz. In other words, the frequency of the ripple voltage is lower than the bandwidth of the power converter. The bandwidth of the power converter 42 should be high enough so that the output voltage of the power converter can produce the desired low frequency voltage that is related to the low frequency voltage across Cout, Vac1. When a switching converter is used as the power converter 42, the bandwidth of the switching converter is around 1/10 of the switching frequency, or 20 KHz, which is normally enough to produce the desired low frequency voltage. If other types of converters are used as the power converter, such as a linear regulator 64 as shown in FIG. 6, the output voltage of the power converter should be able to follow the change of the ripple voltage across Cout (Vac1).

Figure 6:
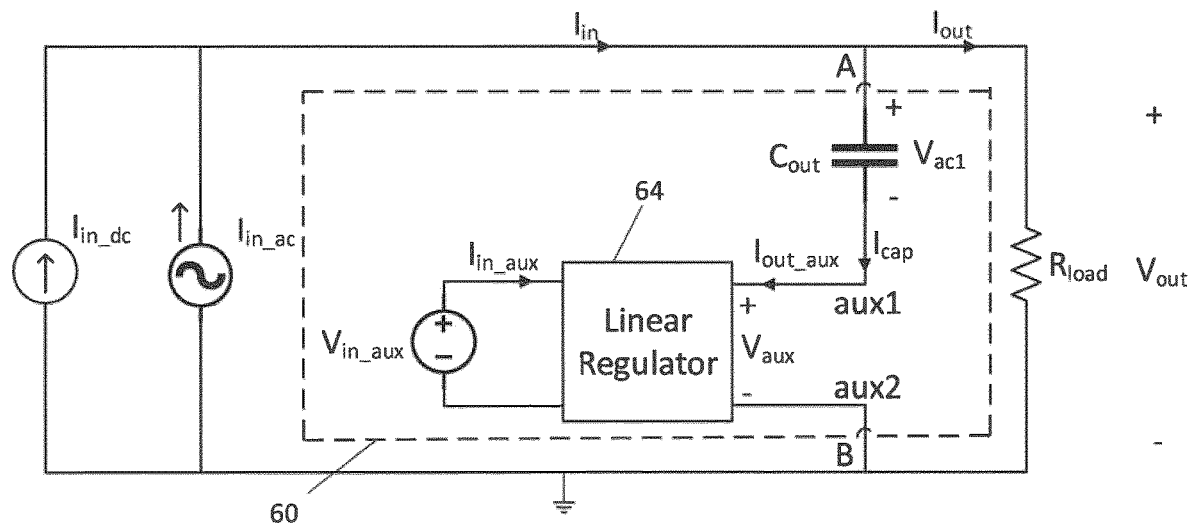
FIG. 6 is a schematic diagram of a generalized power supply incorporating a PCCC and a linear regulator, according to embodiments described herein.

However, for low power applications, a linear regulator may be used as the power converter 64 of the PCCC 60, as shown in FIG. 6. In this case, the requirement is that the bandwidth of the linear regulator should be much higher than the frequency of the ripple voltage across the output capacitor. In this way, the output voltage of the linear regulator can follow the change of the ripple voltage. FIG. 6 shows a general circuit diagram for this implementation. In this figure, the output voltage of the linear regulator (Vaux) has same amplitude as the voltage across Cout (Vac1) and is in opposite phase. It is noted that the output of the linear regulator can be both positive and negative.

Implementation Examples of Power Converter Controlled Capacitor

The previous section describes circuit configurations (circuit topologies) and control strategies of the PCCC, according to certain embodiments. This section provides further examples of circuit configurations and implementation methods. These examples are based on a common application wherein a switching power converter is used as the power converter, and a control mode in which the power converter is controlled to behave as a virtual inductor so that the voltage ripple across Cout is cancelled and the voltage between terminal A and terminal B is a pure DC, or with very small ripple. In the following description, the ripple voltage or ripple current refers to the low frequency AC ripple voltage across Cout (Vac1), or the AC ripple through the capacitor, Cout. The power converter (or switching converter) will also produce a switching frequency ripple voltage and ripple current at the switching frequency. Since the switching frequency ripple is at a much higher frequency than the AC ripple, the switching frequency ripple can be ignored in the operation.

In an implementation of a control circuit, according to one embodiment, an AC voltage sensing circuit may be connected across the capacitor Cout to sense the AC ripple voltage of Vac1. The input of the voltage sensing circuit is the voltage across Cout. The output of the AC voltage sensing circuit is the AC ripple voltage of Vac1_rip. Then, the reverse of the AC ripple voltage (−Vac1_rip) is used as the reference voltage of the power converter.

A full bridge inverter may be used as the power converter to generate the AC voltage. The input voltage of the full bridge inverter (Vin_aux) may be electrically isolated from the terminal A and terminal B so that the complete circuit can operate properly. The Vin_aux may be obtained from a transformer winding of the main power supply that converts the AC voltage into DC voltage. The Vin_aux may also be generated from a separate dedicated power supply.

Then, based on the control strategy as shown in equation (2), the full bridge inverter will generate an AC ripple voltage that is the same amplitude and reverse polarity as compared with the AC ripple voltage of Cout. Therefore, the voltage between terminal A and terminal B is a pure or substantially pure DC. In this case, the output of the full bridge will behave as a virtual inductor.

Partial Compensation of the Ripple Voltage

Figure 1:
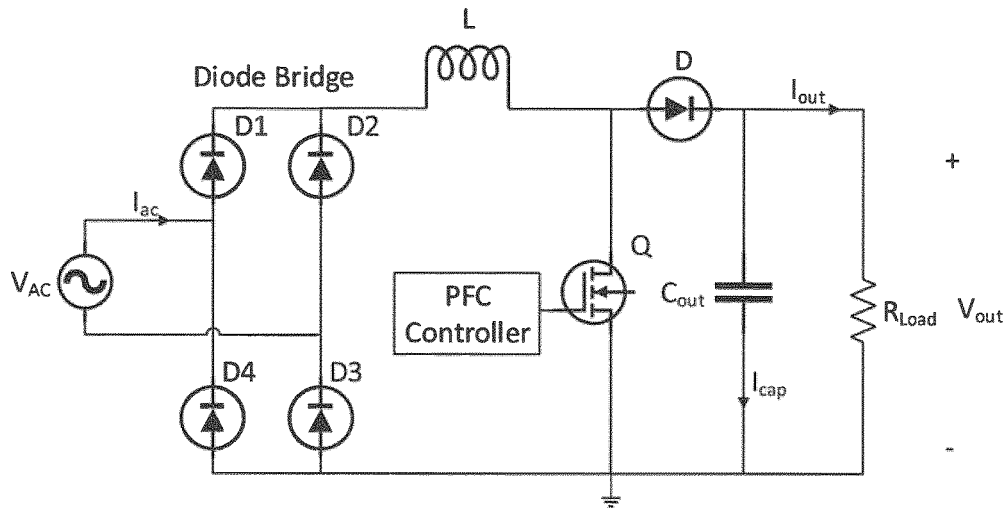
FIG. 1 is a schematic diagram of a boost converter, according to the prior art.
Figure 2:
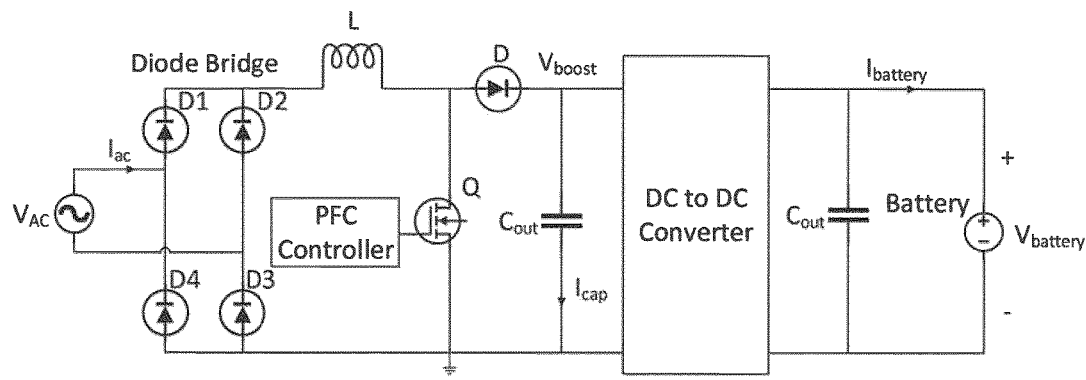
FIG. 2 is a schematic diagram of a boost converter coupled to a DC to DC converter, for an application such as an electric vehicle battery charger, according to the prior art.

In an application as shown in FIG. 2, the boost converter is used to achieve power factor correction and generate a high voltage such as 400V DC (with a 120 Hz ripple). A DC to DC converter is used to convert the Vboost (normally around 400V) to another voltage. In this case a PCCC embodiment may be used to remove the AC ripple voltage across Vboost.

When the value of the capacitor Cout is small, the ripple voltage across Cout is large. It is not desirable to completely compensate the AC voltage ripple of Vac1. Then, the reference voltage for the power converter, such as a full bridge inverter, can be part of the ripple voltage, Vac1_rip, as shown in the following equation:

$$\text{Vaux\_ref} = k*(-\text{Vac1\_rip}) \qquad (13)$$

In the above equation, Vaux_ref is the reference voltage of the power converter (e.g., a full bridge inverter in the example that is discussed here) and the output voltage of the power converter, Vaux, follows the reference voltage, Vaux_ref. The parameter k is a value less than 1 (one) but close to 1 (one). For example, if k=0.8, then 80% of the AC ripple will be removed by the power converter and 20% of the ripple will still be present between terminal A and terminal B, as shown by the following equation:

$$\text{Vout} = \text{Vac1} + \text{Vaux} = \text{Vac1\_dc} + \text{Vac1\_rip} - 0.8 \text{ Vac1\_rip} = \text{Vac1\_dc} + 0.2 \text{ Vac1\_rip} \qquad (14)$$

Figure 13:
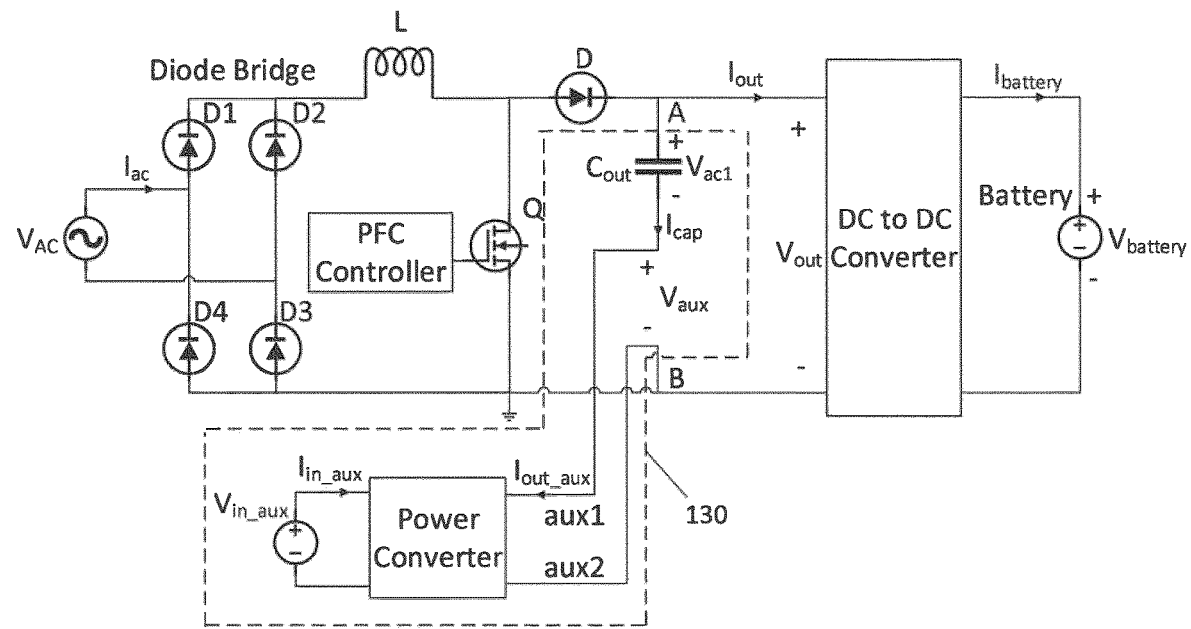
FIG. 13 is a schematic diagram of a boost converter and DC-DC converter, with a PCCC, according to one embodiment.

This is especially attractive in the case when a film capacitor is used to improve long term reliability. In this case, the PCCC circuit will compensate most of the AC ripple and the rest of the AC ripple is removed by the second stage DC-DC converter. An embodiment is shown in the circuit diagram of FIG. 13, with PCCC circuit 130.

Application of PCCC to Single-Stage Power Factor Correction Circuit

When a single stage PFC circuit is employed, the output voltage of the single stage PFC contains 120 Hz ripple. A large capacitor is normally used to limit the 120 Hz ripple to an acceptable range. The PCCC technology can be used to remove the 120 Hz ripple. In this case, the output capacitor of the original single stage PFC circuit will be replaced by the output capacitor connected in series with the output of the power converter, as described herein. The control of the power converter is same as before, equation (2). An isolated power supply is used to generate Vin_aux.

Application of PCCC to AC Capacitor Application

It is noted that a PCCC embodiment may also be used for AC input (without DC). By changing the phase and the amplitude of the output voltage of the power converter, Vaux, the equivalent impedance between terminal A and terminal B (the series connection of the capacitor and the power converter) may be changed. Desired operation modes are that the output of the power converter behaves as a virtual inductor or virtual capacitor so that the equivalent capacitance between terminal A and terminal B can be larger or smaller than the real capacitor Cout.

Implementation Examples

Figure 14:
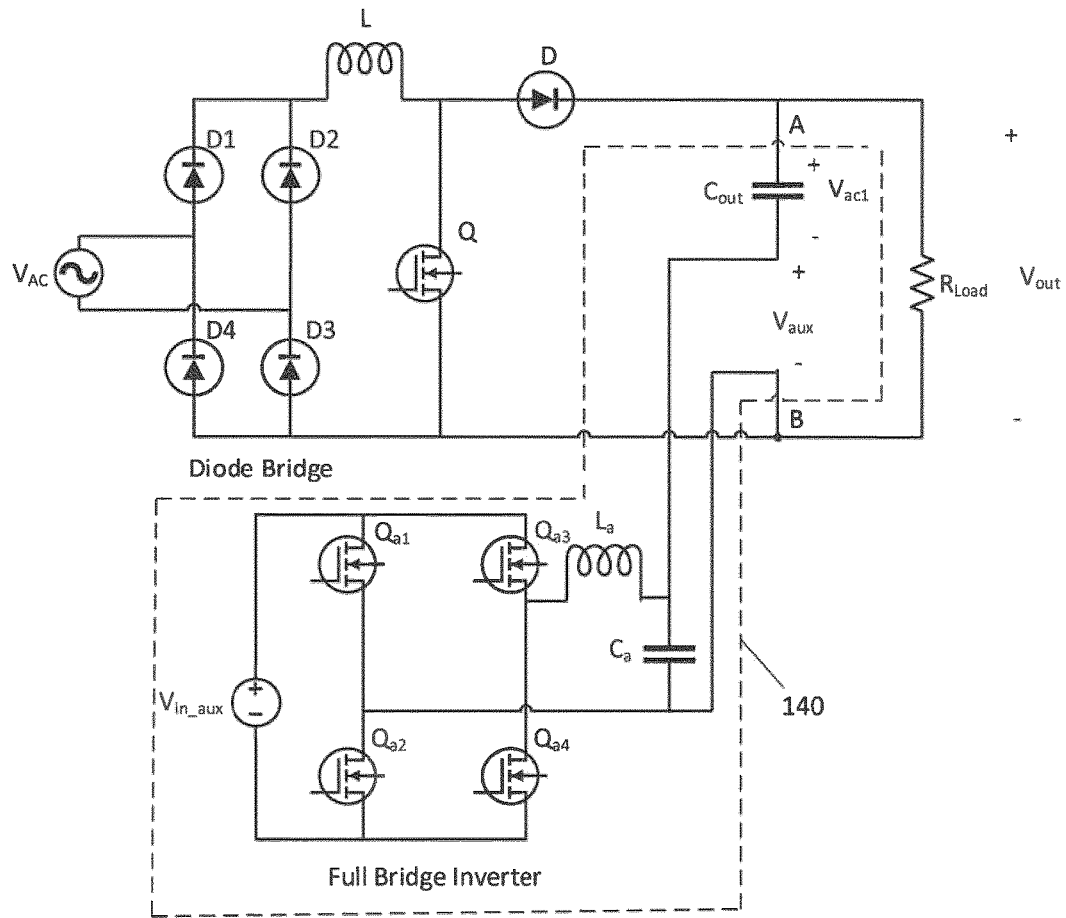
FIG. 14 is a schematic diagram of a boost converter with a PCCC implemented with a full-bridge inverter, according to one embodiment.

FIG. 14 shows a detailed circuit implementation, according to one embodiment. In FIG. 14, a full-bridge inverter is used as the power converter of the PCCC circuit 140 for a boost converter. The output of the full bridge inverter, Vaux, is connected in series with the output capacitor Cout and to the load $R_{LOAD}$. The full bridge inverter generates a voltage, Vaux, to offset the AC component of the voltage Vac1 so that only the DC voltage will be generated across the load, Rload. It is noted that the capacitor, Ca, is part of the output LC filter of the full bridge inverter. The value of Ca depends on the switching frequency. The value of Ca does not depend on the low frequency component that Vaux will compensate. The value of Ca is smaller than the value of Cout in most cases.

The input voltage of the full bridge inverter, Vin_aux, may be generated from an isolated power supply. It is noted that the average power to be provided by Vin_aux is only the power loss in the inverter, which is very small, as described by equation (5). Therefore, the power rating of the power supply to produce Vin_aux is much smaller than the output power.

In the embodiment of FIG. 14, the boost converter is used to convert an AC voltage into DC and to achieve power factor correction. It is noted that a boost converter is a non-isolated converter. In practical implementations, other types of boost converters, such as a bridgeless totem-pole boost converter, may also be used as the AC to DC converter to achieve power factor correction.

Figure 15:
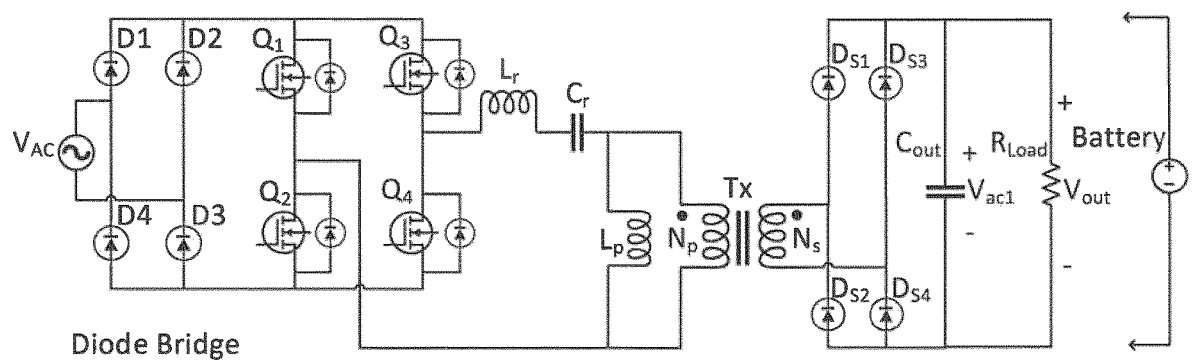
FIG. 15 is a schematic diagram an AC to DC resonant converter with power factor correction, according to the prior art.

It is also noted that an LLC resonant converter may also be used for the AC to DC converter to achieve power factor correction. A typical LLC resonant converter is shown in FIG. 15. One benefit of using an LLC converter for the AC to DC converter with power factor correction is that the input side and output side are isolated by the transformer. In an application such as a battery charger, as shown in FIG. 15, this allows the output of the LLC converter to charge the battery directly, which should be isolated from the input AC voltage. However, because the LLC converter achieves the power factor correction, its output voltage Vo, which is same as Vac1, will contain a large 120 Hz ripple. A large 120 Hz current will flow through the battery if the battery is connected directly to the output of the LLC converter, which will damage the battery.

Figure 16:
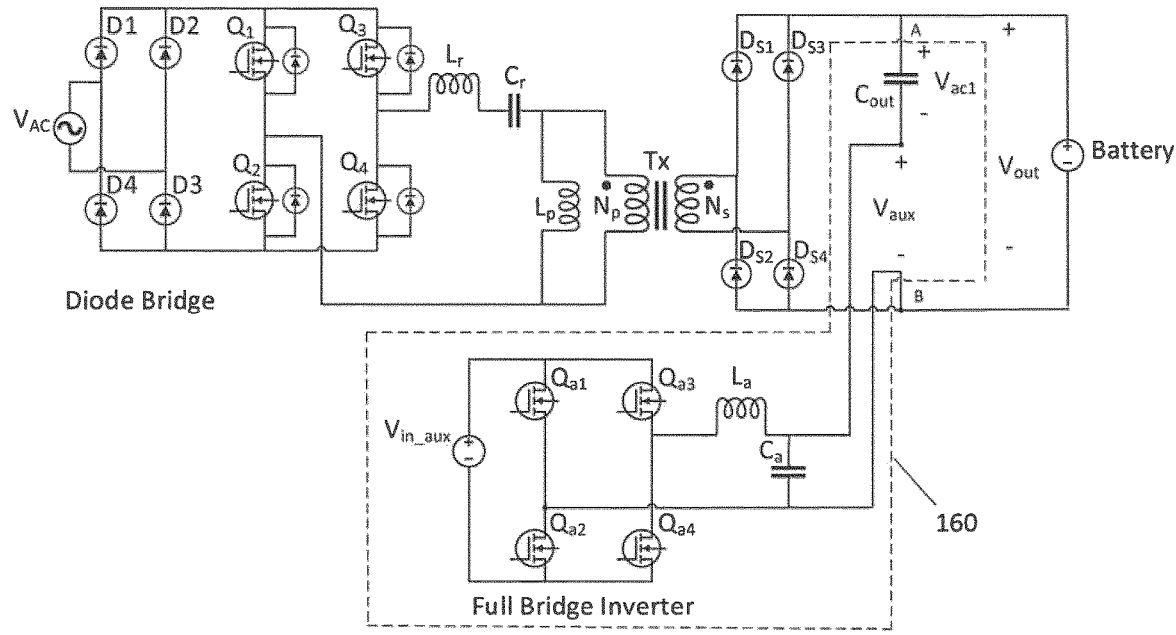
FIG. 16 is a schematic diagram a full-bridge PCCC implemented in a resonant converter operating at power factor correction, according to one embodiment.

FIG. 16 shows an embodiment wherein a PCCC circuit 160, including a full bridge inverter used for the power converter, is used to remove the 120 Hz ripple at the output of an LLC converter operating in power factor correction mode. The output of the full bridge inverter is connected in series with the output capacitor of the LLC converter, Cout, and the combined voltage is the output voltage applied to the battery, or other load. Similarly, the full bridge inverter produces an AC voltage with same amplitude and reverse polarity of Vac1 to cancel the 120 Hz ripple and/or other low frequency ripple, so that a pure or substantially pure DC voltage is applied to the battery, or other load.

Figure 17:
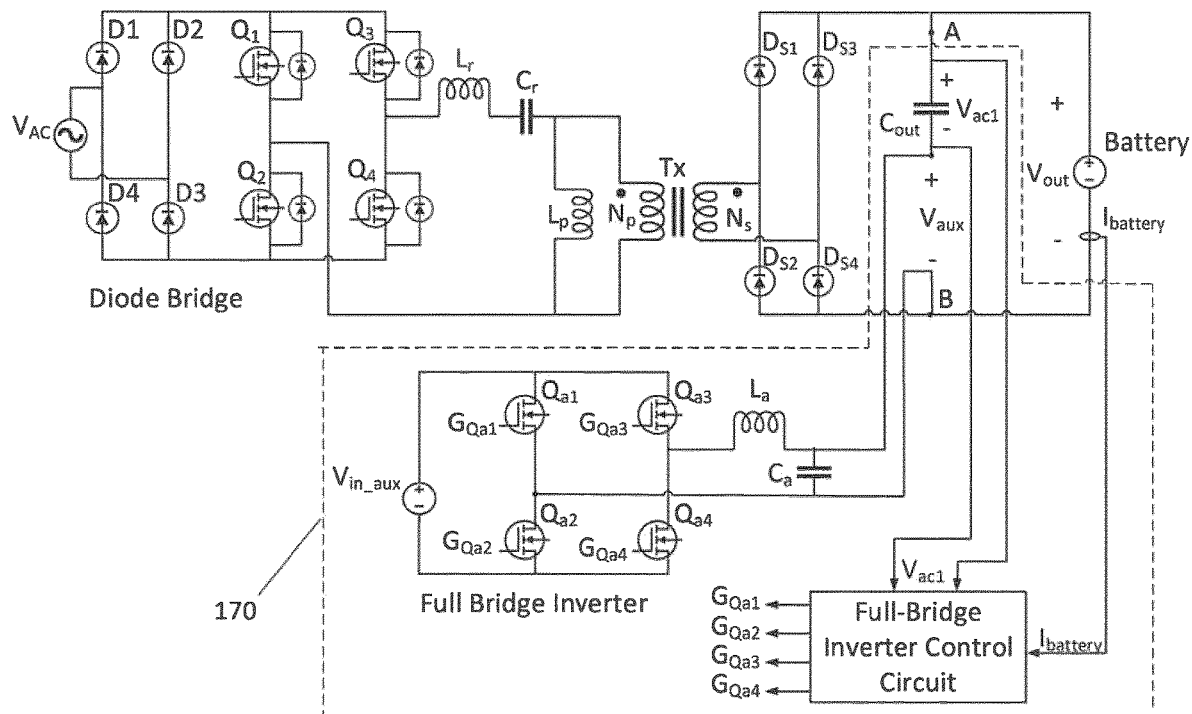
FIG. 17 is a schematic diagram showing a resonant LLC converter at power factor correction with a PCCC circuit and a controller, according to one embodiment.

FIG. 17 shows the embodiment of FIG. 16, together with a controller for the PCCC circuit 170. The LLC converter operates at power factor correction mode and is used to charge a battery. The full bridge inverter control circuit senses the battery current, Ibattery, or Vac1, or both to generate the duty cycles for the gating signals GQa1-GQa4 of the four MOSFETs of the full bridge inverter, Qa1, Qa2, Qa3, and Qa4. The full bridge inverter produces an output voltage (Vaux) to cancel the AC ripple voltage in Vac1.

When the battery current, Ibattery, is used as the input of the full bridge inverter control circuit, the control circuit will generate the required duty cycle for Qa1, Qa2, Qa3, and Qa4 so that the output of the full bridge inverter, Vaux, will cancel the low frequency (which is dominated by the double line frequency, 120 Hz) ripple component of Vac1 and therefore, a pure or substantially pure DC voltage will be produced across the battery and the battery charging current, Ibattery, will be a pure DC current. In this case, the power converter behaves as an inductor.

When the Vac1 voltage is used as the input of the full bridge inverter control circuit, the control circuit will generate the required duty cycles of Qa1, Qa2, Qa3, and Qa4 in order to generate the AC voltage, Vaux, according to equation (2), that has same amplitude and reversed polarity of Vac1 so that the low frequency ripple component of Vac1 (which is dominated by the double line frequency, 120 Hz) will be cancelled and a pure DC voltage (Vout) will be produced at the battery terminal. Therefore, the battery charging current will be a pure DC current. In this case, the power converter also behaves as an inductor.

In other embodiments, the information of both Vac1 and Ibattery, may be used to generate Vaux to cancel the low frequency voltage ripple of Vac1. Again, in this case, the power converter behaves as an inductor.

A practical advantage of a PCCC embodiment as described herein is illustrated by the following numerical example. The battery voltage is 400V and the charging current is 5 A. The total charging power is 2,000 W (=400V×5 A). With a reasonable design, the low frequency voltage ripple across the output capacitor Cout may be about +/−5V peak value. Therefore, the maximum output power of the PCCC power converter is 5 A×5V=25 W, which is much smaller than the total output charging power. In addition, in order to produce 5V peak output voltage, the input voltage, Vin_aux, can be 10V. Therefore, the voltage stress of the MOSFETs Qa1, Qa2, Qa3, and Qa4, is 10V and the peak current stress of the MOSFETs is 5 A. With existing MOSFET technology, the loss of the MOSFETs will be very small. Therefore, the loss of the full bridge inverter is very small. Therefore, the combined LLC AC to DC converter and full bridge inverter under a PCCC control strategy as described herein achieves very high efficiency.

All cited publications are incorporated herein by reference in their entirety.

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:
1. A series circuit, comprising:
a capacitor having a first terminal A and a second terminal;
a power converter having a first output terminal connected to the second terminal of the capacitor and a second output terminal connected to a terminal B, wherein the power converter outputs an auxiliary voltage; and
a controller that controls the auxiliary voltage according to a selected function wherein the auxiliary voltage is approximately equal to a negative value of a ripple voltage across the capacitor.
2. The series circuit of claim 1, wherein the controller comprises a sensing circuit that senses a voltage across the capacitor and uses the sensed voltage to control the auxiliary voltage according to the selected function.
3. The series circuit of claim 1, further comprising a DC power supply for the power converter.
4. The series circuit of claim 1, wherein the power converter comprises a switching converter.
5. A power supply, comprising:
an AC-DC converter having a first input terminal and a second input terminal for receiving AC input power and a first output terminal and a second output terminal for outputting DC power to a load; and
the series circuit of claim 1, wherein the terminal A and the terminal B are connected to the first output terminal and second output terminal, respectively, of the AC-DC converter;
wherein the series circuit operates according to the selected function to produce the auxiliary voltage;
wherein the auxiliary voltage substantially cancels a low frequency AC voltage ripple across the capacitor;
wherein a substantially pure DC output voltage is delivered to the load.

6. The power supply of claim 5, wherein the AC-DC converter comprises a single stage power factor correction (PFC) circuit.

7. The power supply of claim 5, wherein the controller senses at least one of a voltage across the capacitor and a power supply output current, and uses the sensed voltage and/or the sensed power supply output current to control the power converter auxiliary voltage according to the selected function.

8. The power supply of claim 5, further comprising:
a DC-DC converter connected between the first output terminal and the second output terminal of the AC-DC converter and the load, wherein the DC-DC converter cancels a first portion of the low frequency AC voltage ripple across the capacitor;
wherein the series circuit operates according to the selected function to produce the auxiliary voltage;
wherein the auxiliary voltage cancels a second portion of the low frequency AC voltage ripple across the capacitor that is not cancelled by the DC-DC converter;
wherein a substantially pure DC output voltage is delivered to the load.

9. The power supply of claim 5, configured as a power delivery device for one or more portable electronic device.

10. The power supply of claim 5, configured as a battery charger.

11. The power supply of claim 5, configured as a battery charger for an electric vehicle (EV).

12. A method of operating a series circuit comprising
a capacitor having a first terminal A and a second terminal and a power converter having a first output terminal connected to the second terminal of the capacitor and a second output terminal connected to a terminal B, wherein the power converter outputs an auxiliary voltage;
the method comprising:
controlling the auxiliary voltage according to a selected function;
wherein the auxiliary voltage is approximately equal to a negative value of a ripple voltage across the capacitor.

13. The method of claim 12, further comprising sensing a voltage across the capacitor and using the sensed voltage to control the power converter auxiliary voltage according to the selected function.

14. The method of claim 12, comprising:
connecting the terminal A and the terminal B to a first output terminal and a second output terminal, respectively, of an AC-DC converter; and
operating the series circuit according to the selected function to produce the auxiliary voltage;
wherein the auxiliary voltage substantially cancels a low frequency AC voltage ripple across the capacitor;
wherein a substantially pure DC output voltage is delivered to a load.

15. The method of claim 14, wherein the AC-DC converter comprises a single stage power factor correction (PFC) circuit.

16. The method of claim 14, further comprising sensing at least one of a voltage across the capacitor and an output current delivered to the load, and using the sensed voltage and/or the sensed output current to control the auxiliary voltage according to the selected function.

17. The method of claim 14, further comprising:
connecting a DC-DC converter between the first output and the second output terminal of the AC-DC converter and the load, wherein the DC-DC converter cancels a first portion of the low frequency AC voltage ripple across the capacitor;
operating the series circuit according to the selected function to produce the auxiliary voltage;
wherein the auxiliary voltage cancels a second portion of the low frequency AC voltage ripple across the capacitor that is not cancelled by the DC-DC converter;
wherein a substantially pure DC output voltage is delivered to the load.

18. The method of claim 14, configured for a power delivery device for one or more portable electronic device.

19. The method of claim 14, configured for a battery charger.

20. The method of claim 14, configured for a battery charger for an electric vehicle (EV).

* * * * *